United States Patent
An (10) Patent No.: US 10,276,164 B2
(45) Date of Patent: Apr. 30, 2019

(54) MULTI-SPEAKER SPEECH RECOGNITION CORRECTION SYSTEM

(71) Applicant: SORIZAVA CO., LTD., Seoul (KR)

(72) Inventor: Munhak An, Seoul (KR)

(73) Assignee: SORIZAVA CO., LTD., Seoul (KR)

( * ) Notice: Subject to any disclaimer, the term of this patent is extended or adjusted under 35 U.S.C. 154(b) by 0 days.

(21) Appl. No.: 15/823,937

(22) Filed: Nov. 28, 2017

(65) Prior Publication Data

US 2018/0182396 A1    Jun. 28, 2018

(30) Foreign Application Priority Data

Dec. 22, 2016   (KR) .......................... 10-2016-0176567

(51) Int. Cl.
*G10L 17/00* (2013.01)
*G10L 15/26* (2006.01)
(Continued)

(52) U.S. Cl.
CPC ............ *G10L 15/26* (2013.01); *G06F 17/279* (2013.01); *G06F 17/28* (2013.01);
(Continued)

(58) Field of Classification Search
CPC ....... G10L 15/26; G10L 17/00; G10L 15/063; G10L 15/1807; G10L 15/183;
(Continued)

(56) References Cited

U.S. PATENT DOCUMENTS

| 5,636,325 A | * | 6/1997 | Farrett | G10L 13/10 |
| | | | | 704/231 |
| 5,913,196 A | * | 6/1999 | Talmor | G10L 17/00 |
| | | | | 704/270 |

(Continued)

FOREIGN PATENT DOCUMENTS

| JP | 2016-062196 A | 4/2016 |
| KR | 10-2008-0037402 A | 4/2008 |

(Continued)

OTHER PUBLICATIONS

Korean Office Action dated Oct. 23, 2017 corresponding to Korean Application No. KR 10-2016-0176567.

*Primary Examiner* — Vijay B Chawan
(74) *Attorney, Agent, or Firm* — Hauptman Ham, LLP (57) ABSTRACT

The present invention relates to a multi-speaker speech recognition correction system for determining a speaker of an utterance with a simple method and easily correcting speech-recognized text during speech recognition for a plurality of speakers. According to the present invention, when speech signals are input to a multi-speaker speech recognition system from a plurality of microphones which are each provided to a corresponding one of a plurality of speakers, the multi-speaker speech recognition correction system may detect a speech session from a time point at which input of each of the speech signals is started to a time point at which the input of the speech signal is stopped, and a speech recognizer may convert only the detected speech sessions into text so that a speaker of an utterance can be (Continued)

identified by a simple method and speech recognition can be carried out at a low cost.

4 Claims, 7 Drawing Sheets

(51) Int. Cl.
    *G06F 17/28* (2006.01)
    *G10L 21/12* (2013.01)
    *G10L 15/32* (2013.01)
    *G10L 21/0272* (2013.01)
    *G10L 15/08* (2006.01)
    *G06F 17/30* (2006.01)
    *G06F 17/27* (2006.01)

(52) U.S. Cl.
    CPC ........ *G06F 17/30746* (2013.01); *G10L 15/08* (2013.01); *G10L 15/32* (2013.01); *G10L 21/0272* (2013.01); *G10L 21/12* (2013.01)

(58) Field of Classification Search
    CPC ....... G10L 21/12; G10L 25/63; G10L 15/065; G10L 17/04; G10L 17/06; G10L 25/24; G10L 21/003
    USPC ....... 704/245, 235, 260, 251, 233, 231, 258, 704/275, 270.1, 257, 247, 9
    See application file for complete search history.

(56) References Cited

U.S. PATENT DOCUMENTS

| | | | | |
|---|---|---|---|---|
| 6,064,963 A * | 5/2000 | Gainsboro | ............... | G10L 15/26 379/88.01 |
| 6,161,090 A * | 12/2000 | Kanevsky | ............... | G10L 17/22 704/246 |
| 6,477,491 B1 * | 11/2002 | Chandler | ................ | G10L 15/26 704/235 |
| 7,236,931 B2 * | 6/2007 | He | ......... | G10L 15/063 704/235 |
| 8,150,687 B2 * | 4/2012 | Mori | ....... | G10L 15/26 704/231 |
| 8,209,174 B2 * | 6/2012 | Al-Telmissani | ........ | G10L 17/04 704/238 |
| 8,849,666 B2 * | 9/2014 | Jaiswal | ................ | G10L 21/003 704/251 |
| 9,300,790 B2 * | 3/2016 | Gainsboro | .......... | H04M 3/2281 |
| 10,084,920 B1 * | 9/2018 | Gainsboro | .......... | H04M 3/2281 |
| 10,127,928 B2 * | 11/2018 | Gainsboro | .......... | H04M 3/2281 |
| 2004/0049385 A1 * | 3/2004 | Lovance | ............... | G10L 15/063 704/235 |
| 2004/0088162 A1 * | 5/2004 | He | ......... | G10L 15/063 704/235 |
| 2005/0143994 A1 * | 6/2005 | Mori | ....... | G10L 15/26 704/235 |
| 2007/0244702 A1 * | 10/2007 | Kahn | ..................... | G10L 15/22 704/260 |
| 2008/0312926 A1 * | 12/2008 | Vair | ..................... | G10L 17/14 704/249 |
| 2010/0268537 A1 * | 10/2010 | Al-Telmissani | ........ | G10L 17/04 704/246 |
| 2011/0301952 A1 * | 12/2011 | Koshinaka | ............. | G10L 15/32 704/235 |

FOREIGN PATENT DOCUMENTS

| | | |
|---|---|---|
| KR | 10-2011-0095314 A | 8/2011 |
| KR | 10-2014-0077514 A | 6/2014 |
| KR | 10-2015-0089168 A | 8/2015 |
| KR | 10-2016-0035884 A | 4/2016 |
| KR | 10-2016-0108874 A | 9/2016 |

\* cited by examiner

| Time | Text | Speaker Information | CHK |
|---|---|---|---|
| 00:00:00 | in today's forum | First Speaker | |
| 00:00:02 | we have invited the chairman of the national assembly as the third speaker | Second Speaker | |
| 00:00:04 | Hello | Third Speaker | CHK |
| 00:00:07 | let me introduce the fourth speaker | First Speaker | |
| 00:00:09 | Yes, hello | Fourth Speaker | |

| Time | Text | Speaker Information | CHK |
|---|---|---|---|
| 00:00:11 | First, we will have our introductory remarks. | | |
| 00:00:00 | In today's forum | First Speaker | |
| 00:00:02 | We have invited the chairman of the national assembly as the third speaker. | Second Speaker | |
| 00:00:04 | Hello. | Third Speaker | |
| 00:00:07 | Let me introduce the fourth speaker. | First Speaker | |
| 00:00:09 | Yes, hello. | Fourth Speaker | |

First Speaker: In today's forum
Second Speaker: We have invited the chairman of the national assembly as the third speaker.
Third Speaker: Hello.
First Speaker: Let me introduce the fourth speaker.
Fourth Speak: Yes, hello.

| BTW | Play | FF | Rec | Speed |

MULTI-SPEAKER SPEECH RECOGNITION CORRECTION SYSTEM

CROSS-REFERENCE TO RELATED APPLICATION

This application claims priority to and the benefit of Korean Patent Application No. 10-2016-0176567, filed in the Korean Intellectual Property Office on Dec. 22, 2016 respectively, the entire contents of which are incorporated herein by reference.

Field of the Invention

The present invention relates to a speech recognition correction system, and more particularly, to a multi-speaker speech recognition correction system for determining a speaker of an utterance with a simple method and easily correcting speech-recognized text during speech recognition for a plurality of speakers.

Description of Related Art

A speech recognition technology is a technology that allows a computer to convert acoustic signals acquired through sound sensors, such as microphones, into words or sentences.

Korean Laid-Open Patent Publication No. 2008-0037402 discloses a "method for making a conference record file in a mobile terminal" for speech recognition.

The disclosed method for making a conference record file in a mobile terminal includes: a display unit configured to browse a text file; a microphone unit configured to externally receive voices of a plurality of speakers; a storage unit configured to store voice information of the speakers and corresponding speaker information; a control unit including a voice recording unit configured to record a specific part of an input voice, a speech separation unit configured to separate a recorded voice file by speaker on the basis of a frequency band, a speech recognition unit configured to determine whether the separated voice file matches pre-stored voice information of the speaker, and, when it is determined that the separated voice file matches the pre-stored voice information, convert the separated voice file into a text file on the basis of the speaker information, and a file management unit configured to store, browse, and transmit the converted text file; and a wireless transceiving unit configured to transmit the converted text file to another user, wherein the control unit controls the display unit to display the converted text file in the form of time-series dialog information between a plurality of speakers classified on the basis of the speaker information.

However, this method for making a conference record file in a mobile terminal has a problem in that speakers are identified through a complicated algorithm for separating the speakers on the basis of a frequency band of a voice file.

In an effort to solve the above problem, Korean Laid-Open Patent Publication No. 2014-0077514 discloses a "conference record managing apparatus" capable of identifying a plurality of speakers with a simple method.

The disclosed conference record managing apparatus includes: a speaker identifying unit configured to identify speakers from voice signals input thereto from a plurality of microphones, wherein a sound volume of the voice signal input from each of the microphones is adjusted and normalized to a reference sound volume according to a sound volume setting of each of the microphones, and the speaker is identified from the normalized voice signal; a voice single processing unit configured to store the voice signal of the speaker identified by the speaker identifying unit; a conference record processing unit configured to generate a conference record, convert an utterance recognized from the voice signal of the speaker identified by the speaker identifying unit into text and record the text in the conference record; and a conference record storage unit configured to store the conference record generated by the conference record processing unit.

That is, the above related art discloses a conference record managing apparatus which can identify speakers with a simple method of providing each of the plurality of speakers with a microphone.

Meanwhile, speech recognition is carried out through a speech recognition company that has a speech recognition engine. The speech recognition engine calculates costs on the basis of the amount of time of speech input thereto.

In this case, when all utterances input through a plurality of microphones are transmitted through the microphones, as in the above-described conference record managing apparatus, a problem in that a massive amount of data being data exchanged in addition to an increase in cost for speech recognition arises.

Technical Problem

Therefore, the present invention is directed to providing a multi-speaker speech recognition correction system capable of performing speech recognition for a plurality of speakers at a low cost while determining a speaker of an utterance with a simple method.

In addition, the present invention is also directed to providing a multi-speaker speech recognition correction system capable of easily correcting speech-recognized text during speech recognition for a plurality of speakers.

Technical Solution

One aspect of the present invention provides a multi-speaker speech recognition correction system including: a speech signal detector configured to, when a plurality of speech signals are received from a plurality of microphones which are each provided to a corresponding one of a plurality of speakers, detect speech sessions from a time point at which input of each of the speech signals is started to a time point at which the input of the speech signal is stopped; a speech recognizer configured to receive the speech sessions including time information and microphone identification information and convert each of the speech sessions to text; and a text corrector configured to receive speech sessions from the speech signal detector, arrange and display the speech sessions in the order of time points at which the inputs of the speech signals are started, and receive information for correcting the speech-recognized text.

The speech session may include the time information and the microphone identification information.

The text corrector may receive speaker information for changing the microphone identification information and arrange and display the speaker information and pieces of the speech-recognized text according to time.

The multi-speaker speech recognition correction system may further include a speech combiner configured to receive the speech sessions from the speech signal detector and combine the speech sessions in the order of the time points at which the inputs of the speech signals are started.

The text corrector may output a speech combined by the speech combiner together with the speech-recognized text.

The text corrector may output an image obtained by capturing each of the plurality of speakers and display speaker tags for identifying each of the speakers in the image.

The text corrector may include a real-time input mode in which the speech-recognized text is displayed and a speaker tag matching speaker information of the displayed text is highlighted for recognition, a correction mode in which a speaker tag matching speaker information of text to be corrected is highlighted for recognition when information for correcting the speech-recognized text is input, and a speaker-specified play mode in which speech-recognized text or utterances of speech sessions of a speaker matching a selected speaker tag is output according to time when a selection signal is input for each of the speaker tags.

The text corrector may pause the display of the text when the information for correcting the speech-recognized text is received, and, when the correction is completed, the text corrector may resume the display of the text by returning to a point in time a predetermined amount of time in the past.

The text corrector may display a punctuation mark by determining whether text received from the speech recognizer has an ending.

The text corrector may transmit characteristic information of a speaker corresponding to each piece of the microphone identification information to the speech recognizer in advance, and the speech recognizer may transmit corrected text to the text corrector, wherein the text is corrected by applying the characteristic information received from the text corrector.

The characteristic information may include dialects, foreign words, exclamations, or fillers, and the speech recognizer may convert the dialect to standard language, convert a foreign word to a native word, or remove an exclamation or a filler, which is a habit of the speaker, and transmit a result thereof to the text corrector.

The multi-speaker speech recognition correction system may further include a reviser configured to display a speech recognition result obtained by the speech recognizer and a correction result obtained by the text corrector to each of the plurality of speakers.

The reviser may receive information for correction or a revision completion signal, and transmit the signal to the text corrector.

Advantageous Effects

According to the present invention, when speech signals are input to a multi-speaker speech recognition system from a plurality of microphones which are each provided to a corresponding one of a plurality of speakers, the multi-speaker speech recognition correction system may detect a speech session from a time point at which input of each of the speech signals is started to a time point at which the input of the speech signal is stopped, and a speech recognizer may convert only the detected speech sessions into text so that a speaker of an utterance can be identified by a simple method and speech recognition can be carried out at a low cost.

In addition, in the multi-speaker speech recognition correction system according to the embodiment of the present invention, a text corrector which corrects speech-recognized text outputs an utterance uttered by a speaker as well as the speech-recognized text so that a corrector can correct the text while clearly recognizing the speaker's utterance.

DETAILED DESCRIPTION

In the following description, detailed descriptions of well-known functions or constructions will be omitted since they would obscure the invention in unnecessary detail.

It should be understood that the terms used in the specification and the appended claims are not to be construed as being limited to their general and dictionary meanings, but are to be interpreted on the basis of meanings and concepts corresponding to technical aspects of the present invention on the basis of the principle that the inventor is allowed to define terms appropriately for the best explanation. Therefore, the description proposed herein is simply a preferable example for the purpose of illustrations only and is not intended to limit the scope of the invention, and thus it should be understood that other equivalents and modifications can be made thereto without departing from the spirit and scope of the invention.

Hereinafter, exemplary embodiments of the present invention will be described in detail.

Figure 1:
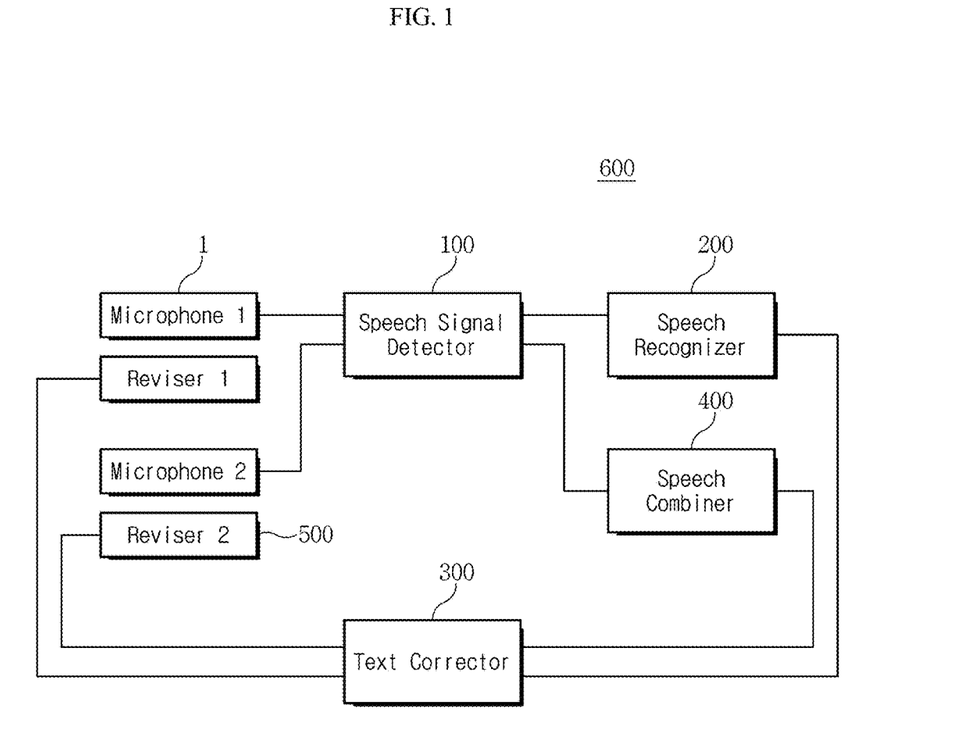
FIG. 1 is a block diagram illustrating a configuration of a multi-speaker speech recognition correction system according to one embodiment of the present invention.
Figure 2:
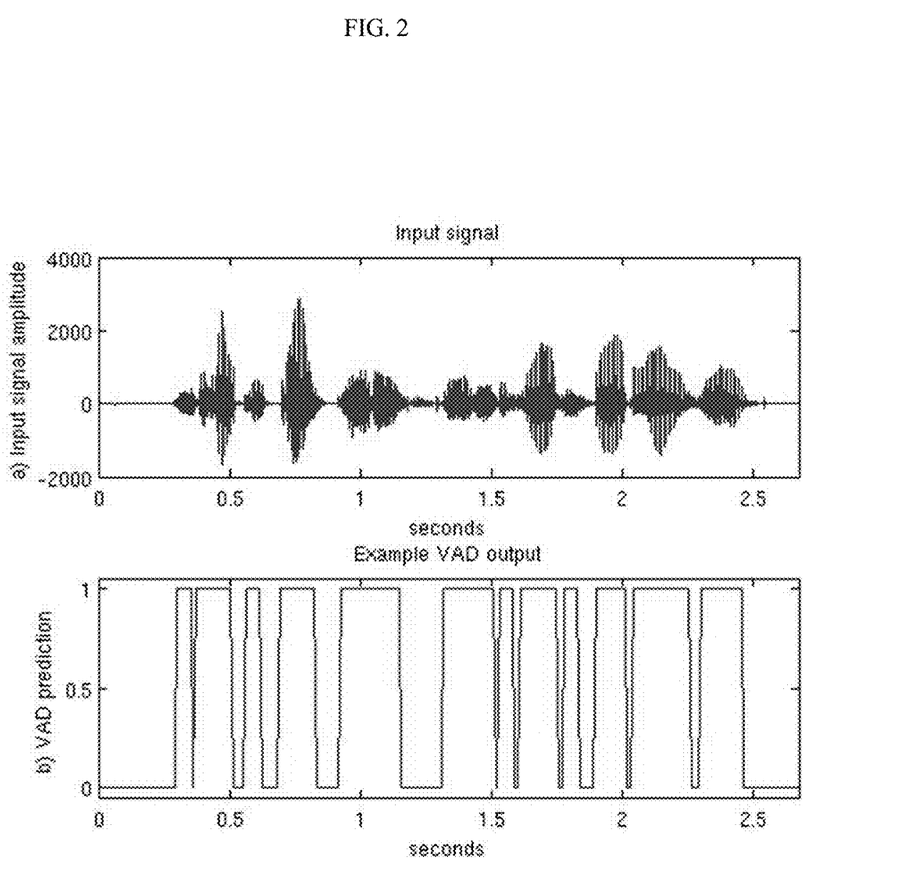
FIG. 2 is a diagram for describing speech signal detection of a speech signal detector according to one embodiment of the present invention.

FIG. 1 is a block diagram illustrating a configuration of a multi-speaker speech recognition correction system according to one embodiment of the present invention, and FIG. 2 is a diagram for describing speech signal detection of a speech signal detector according to one embodiment of the present invention.

Referring to FIGS. 1 and 2, a multi-speaker speech recognition correction system 600 according to one embodiment of the present invention includes a speech signal detector 100, a speech recognizer 200, and a text corrector 300.

The speech signal detector 100 receives a speech signal from each of a plurality of microphones 1. In this case, the plurality of microphones 1 may be provided to a plurality of speakers. For example, a microphone 1 may be provided to a speaker 1, and a microphone 2 may be provided to a speaker 2. That is, each of the speakers is provided with one of the plurality of microphones 1 so that the speakers can be identified by distinguishing speech signals input to the speech signal detector 100 from the microphones without an algorithm for identifying the speakers.

In addition, when the speech signal detector 100 receives speech signals from the microphones 1, the speech signal detector 100 detects each speech session from a time point at which input of a corresponding speech signal is started to a time point at which the input of the speech signal is stopped. That is, the speech signal detector 100 converts an analog signal input from each of the microphones 1 into a digital signal, and determines and detects a time point at which the input of the speech signal is started and a time point at which the input of the speech signal is stopped. In this case, whether the input of the speech signal is stopped may be determined according to a predetermined time interval, and when a speech signal is not input for the predetermined time interval, it may be determined that a corresponding speech signal is one session.

As described above, when the speech signal detector 100 detects a speech session, the speech signal detector 100 may include microphone identification information for identifying a microphone thereof and time information. The speech signal detector 100 may transmit the detected speech session to the speech recognizer 200 and the text corrector 300. In this case, the speech signal detector 100 may remove a time interval in which speech is not input from the signal input from the microphone 1, and transmit a time interval of the speech signal in which speech is substantially input to the speech recognizer 200 or the text corrector 300.

Meanwhile, the speech signal detector 100 may combine generated speech sessions according to an order of time points at which inputs of speech recognition signals are started and transmit a combined speech to the speech recognizer 200. For example, when there is a time point at which speech signals input from the plurality of microphones 1 overlap, the speech signal detector 100 may determine a priority thereof according to a time point at which input of each of the speech signals is started, combine the speech signals into a form of a single speech signal by attaching a subsequently input speech signal to an end of a previously input speech signal, and transmit the single speech signal to the speech recognizer 200.

The speech recognizer 200 receives a plurality of speech sessions, which are input from the plurality of microphones 1, from the speech signal detector 100 and converts the received speech sessions into a text form. When the speech sessions are input, the speech recognizer 200 extracts feature vectors required for speech recognition from the speech sessions. In this case, the feature vectors are set to represent phonetic characteristics and to be insensitive to other factors, i.e., background noise, speaker differences, pronunciation attitudes, etc. Then, the speech recognizer 200 performs pattern classification for extracting potential words by comparing the feature vector with a stored word model, i.e., with a phonetic characteristic of each word or a phoneme-based acoustic model.

In addition, the speech recognizer 200 performs sentence-based searching on the result of the pattern classification in the form of a series of candidate words or candidate phonemes. In this case, the speech recognizer 200 determines the most appropriate word or phoneme by determining whether a word or a phoneme matches a grammatical structure, overall sentence context, and a specific subject based on information regarding candidate words or candidate phonemes. The speech recognizer 200 may transmit text which is completed through the above process to the text corrector 300.

The text corrector 300 receives speech-recognized text from the speech recognizer 200. In this case, the text corrector 300 may receive pieces of text obtained by recognizing speech in each speech session from the speech recognizer 200, arrange the pieces of text in an order of time points at which inputs of the speech signals are started on the basis of time information and microphone identification information contained in the speech sessions, and include matched microphone identification information in each of the pieces of text.

In addition, the text corrector 300 may acoustically reproduce images of the plurality of speakers provided with the microphones and utterances uttered by the plurality of speakers, and provide the reproduction results to a corrector. Then, the text corrector 300 may receive information for correcting the speech-recognized text from the corrector and correct erroneously recognized text on the basis of the received information.

As described above, when speech signals are input from the plurality of microphones 1 which are provided to the plurality of speakers, the multi-speaker speech recognition correction system 600 according to the embodiment of the present invention may detect a speech session from a time point at which input of each speech signal is started to a time point at which the input of the speech signal is stopped, and the speech recognizer converts only the detected speech sessions into text, and thus a speaker of an utterance can be identified by a simple method and speech recognition can be carried out at a low cost.

In addition, in the multi-speaker speech recognition correction system 600 according to the embodiment of the present invention, the text corrector 300 which corrects the speech-recognized text outputs the utterance uttered by the speaker together with the speech-recognized text, and thus the corrector can correct the text while clearly recognizing the speaker's speech.

Meanwhile, the multi-speaker speech recognition correction system 600 may further include a speech combiner 400 which combines the speech sessions detected by the speech signal detector 100 and a reviser 500 which displays a speech recognition result obtained by the speech recognizer 200 and a correction result obtained by the text corrector 300 to each of the plurality of speakers.

Figure 3:
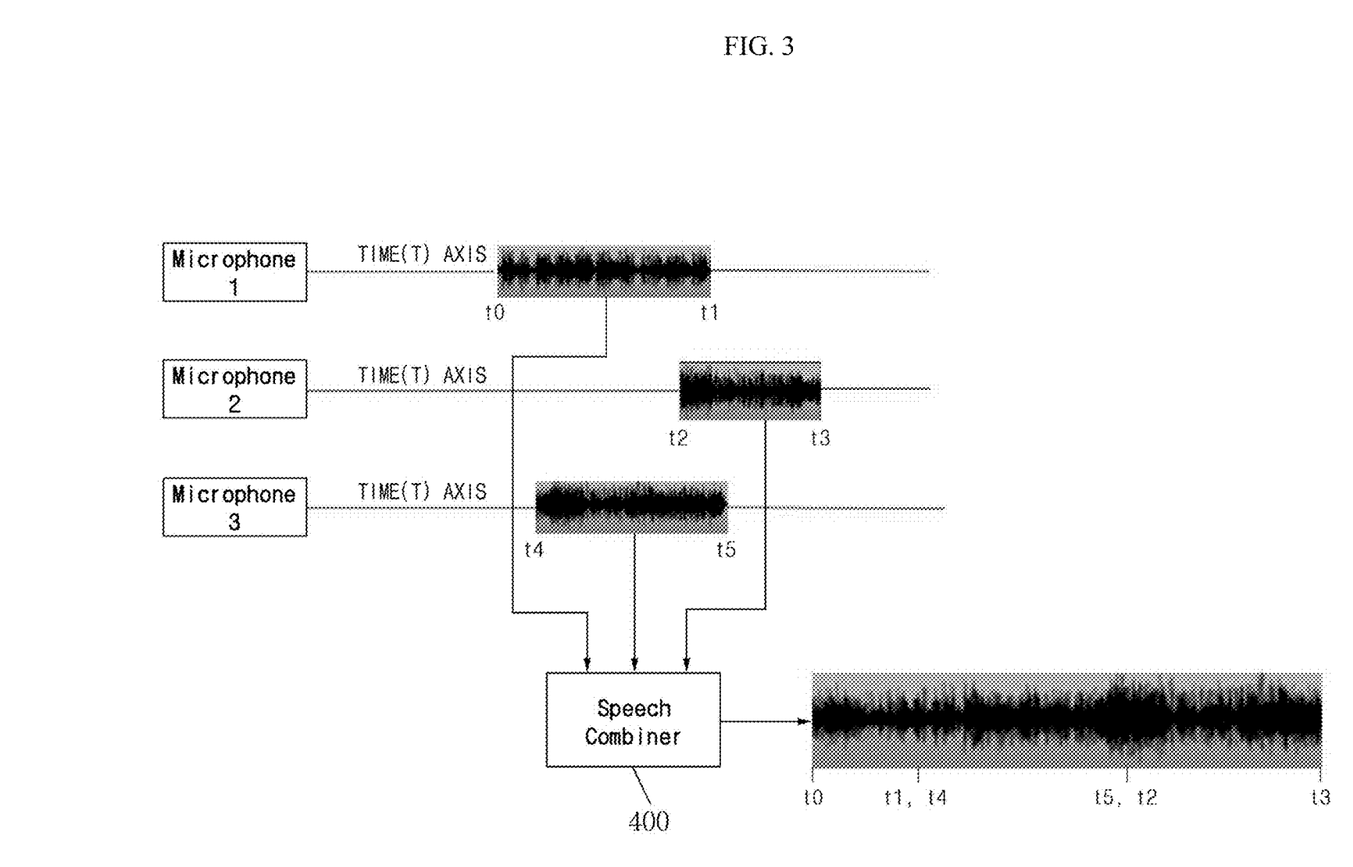
FIG. 3 is a schematic diagram illustrating a speech combination process of a speech combiner according to one embodiment of the present invention.
Figure 4:
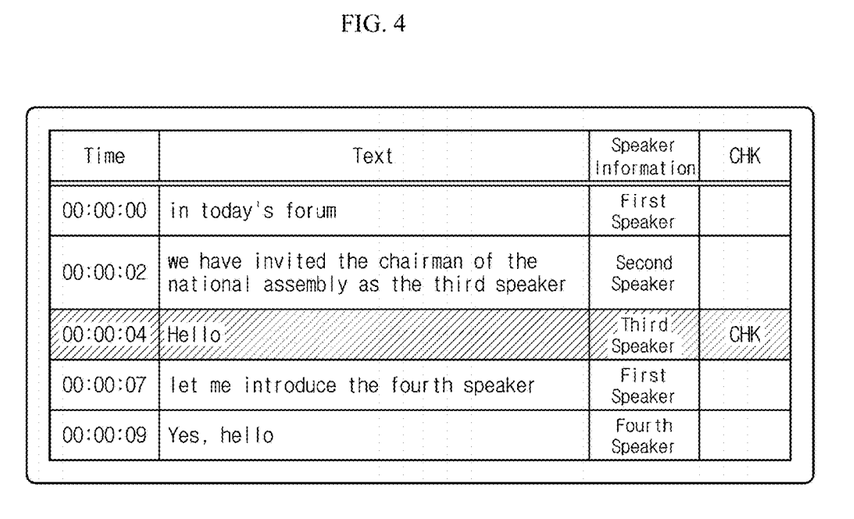
FIG. 4 is a diagram illustrating an example of a screen displayed on a reviser according to one embodiment of the present invention.

FIG. 3 is a schematic diagram illustrating a speech combination process of the speech combiner according to one embodiment of the present invention, and FIG. 4 is a diagram illustrating an example of a screen displayed on the reviser according to one embodiment of the present invention.

Referring to FIGS. 1 to 4, the speech combiner 400 may receive speech sessions from the speech signal detector 100, combine them in order of time points at which inputs of speech recognition signals are started, and transmit the combined speech to the text corrector 300. For example, when there is a time point at which speech signals input from the plurality of microphones 1 are superimposed, the speech combiner 400 may determine a priority thereof according to a time point at which input of each of the speech signals is started and combine the speech signals into a form of a single speech signal by attaching a subsequently input speech signal to an end of a previously input speech signal.

That is, as shown in FIG. 4, when input of a speech signal through the microphone 1 is started at t0 and is stopped at t1, an interval from t0 to t1 may be one speech session. At this time, when another speech session (t2 to t3) is input through the microphone 2 and still another speech session (s4 to s5) is input through a microphone 3 he same time, an overlapping speech interval may occur.

The speech combiner 400 may combine such overlapping speech sessions according to the order of time points at which the inputs the speech signals are stated, i.e., in the order of the speech session from t0 to t1, the speech session from t4 to t5, and the speech session from t2 to t3, and transmit the combined speech to the text corrector 300.

In this case, the text corrector 300 may output the speech combined by the speech combiner 400 together with speech-recognized text.

The reviser 500 may display a speech recognition result obtained by the speech recognizer 200 and a result of correction obtained by the text corrector 300. For example, the reviser 500 may be configured with a display device, such as a monitor, and an input device, such as a keyboard and the like. For example, the reviser 500 may show the speech-recognized text and distinctively display a part corrected by the text corrector 300 in the shown text, and thus the speaker can directly view and check the speech recognition result. In this case, the reviser 500 may receive information for correction from the speaker and directly correct the text, or may receive a revision completion signal and transmit the signal to the text corrector 300.

Hereinafter, the text corrector according to one embodiment of the present invention will be described in detail.

Figure 5:
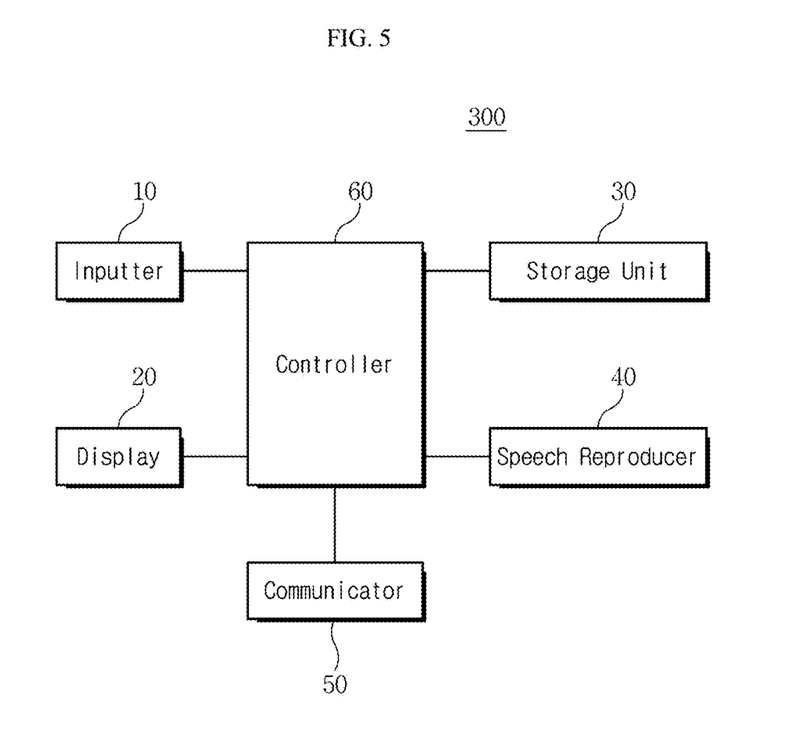
FIG. 5 is a block diagram illustrating a configuration of a text corrector according to one embodiment of the present invention.
Figure 6:
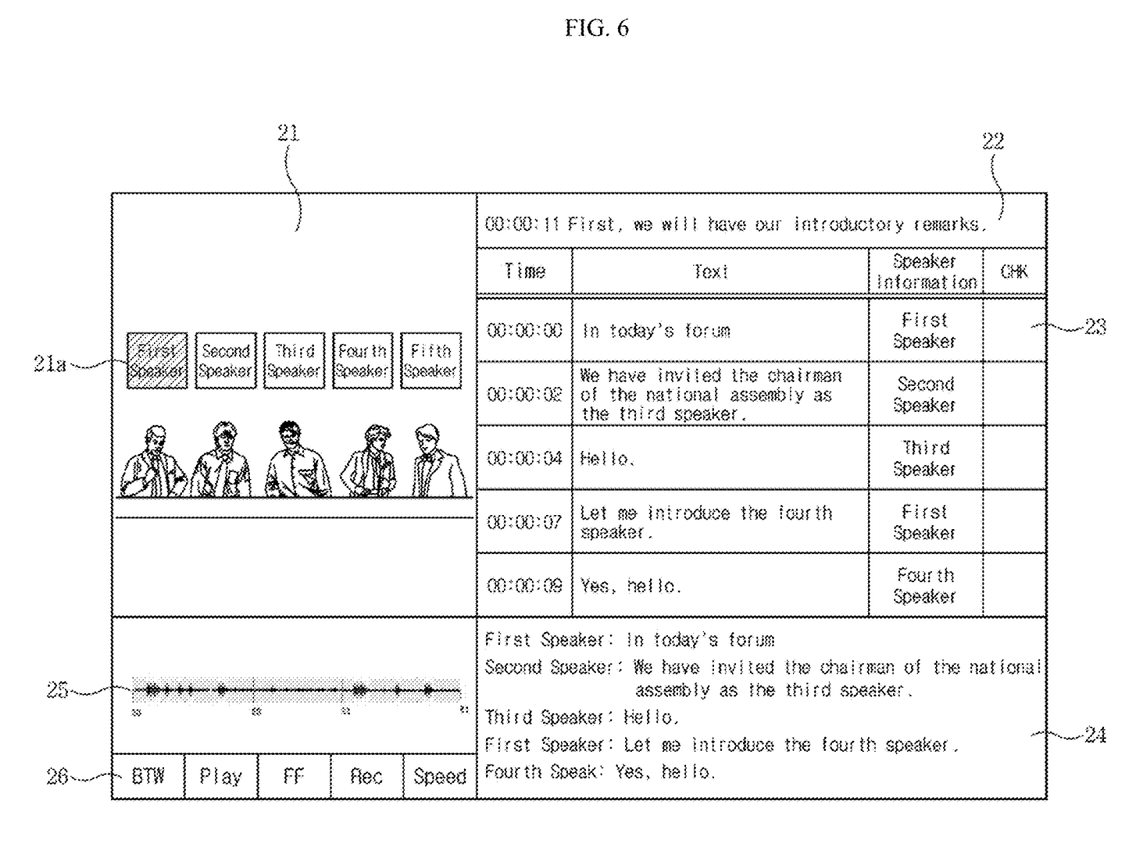
FIGS. 6 to 8 are diagrams showing each mode of the text corrector according to one embodiment of the present invention.
Figure 7:
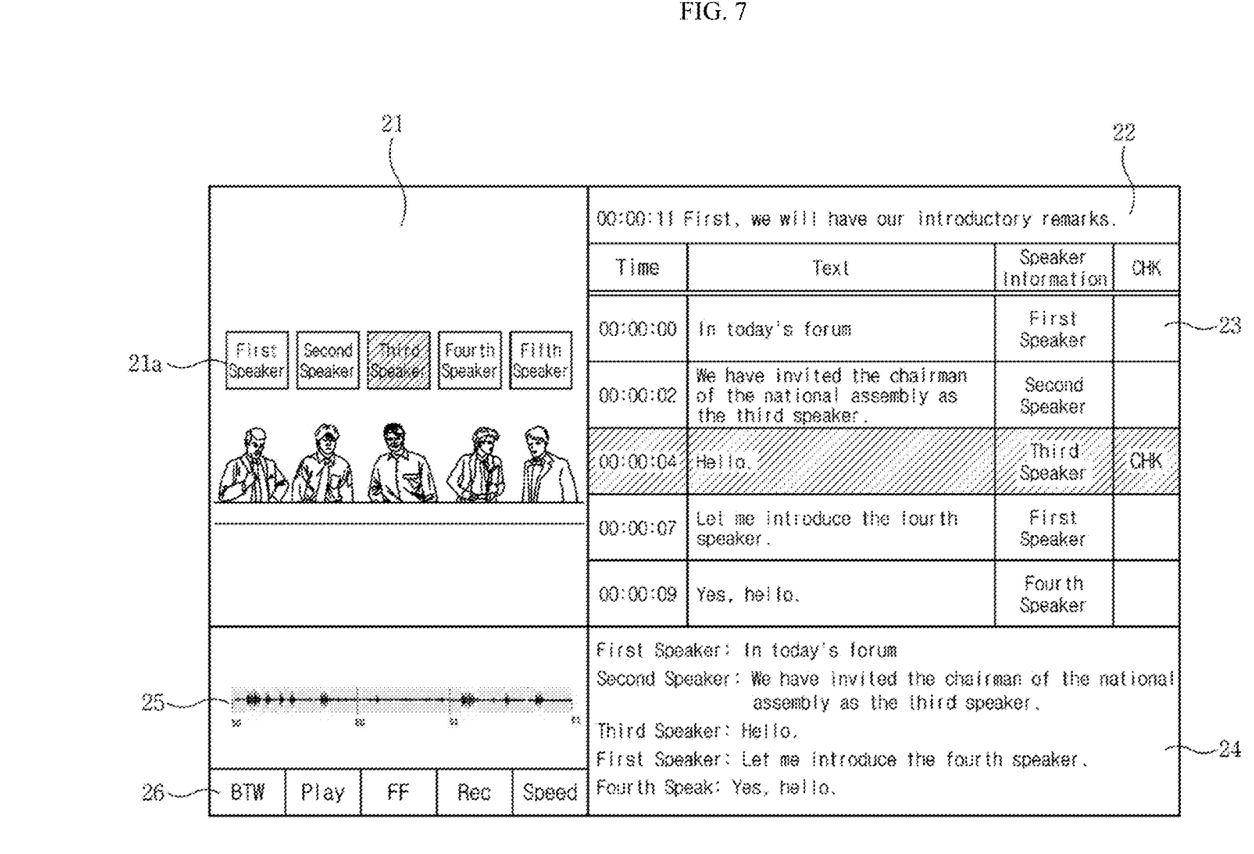
Figure 8:
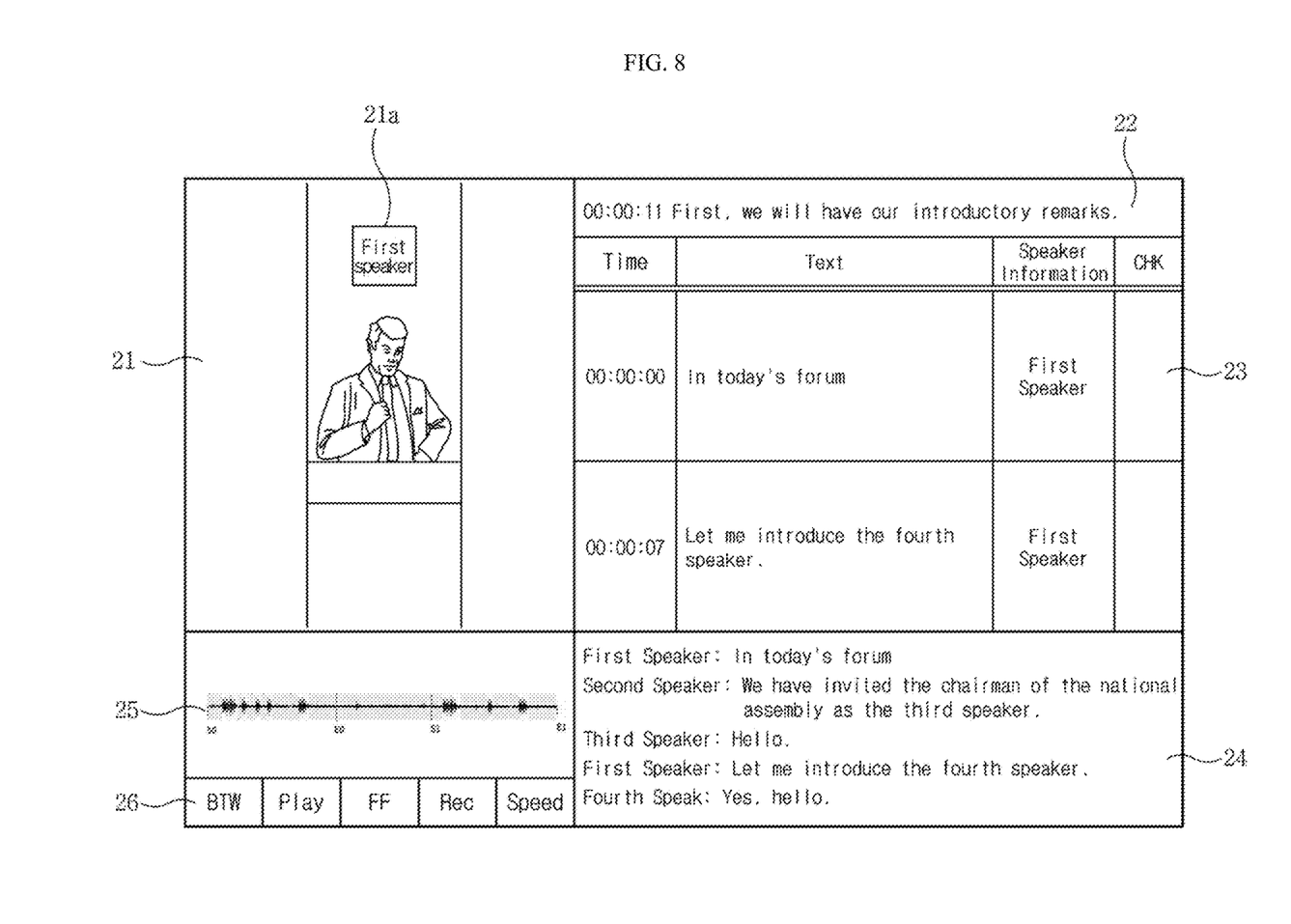

FIG. 5 is a block diagram illustrating a configuration of the text corrector according to one embodiment of the present invention, and FIGS. 6 to 8 are diagrams showing each mode of the text corrector according to one embodiment of the present invention.

Referring to FIGS. 5 and 8, the text corrector 300 according to one embodiment of the present invention includes an inputter 10, a display 20, a storage unit 30, a speech reproducer 40, a communicator 50, and a controller 60.

The inputter 10 receives a variety of information, such as number information, character information, and the like, and transmits signals which are input for various function settings and function control of the text corrector 300 to the controller 60. For example, the inputter 10 may be an input device, such as a keypad, a mouse, a joystick, or the like, and may preferably be a shorthand keyboard which can quickly correct an erroneously recognized word or sentence. The inputter 10 may receive information for correcting speech-recognized text from a corrector. In this case, the corrector may move a cursor for correction on speech-recognized text on the display 20 through the inputter 10 and correct the speech-recognized text by inputting the information for correction, that is, a corrected word, thereto.

The display 20 displays information about a series of operation statuses and operation results which occur during the operation of the text corrector 300. In addition, the display 20 may display a menu of the text corrector 300 and user data input by a user. Here, the display 20 may be configured with a liquid crystal diode (LCD), a thin film transistor LCD (TFT-LCD), a light emitting diode (LED), an organic LED (OLED), an active matrix OLED (AMOLED), a retina display, a flexible display, a three-dimensional display, and the like.

The display 20 may include a first display window 21, a second display window 22, a third display window 23, a fourth display window 24, a fifth display window 25, and a sixth display window 26.

The first display window 21 may display an image of a plurality of speakers wearing microphones. In this case, the first display window 21 may display a speaker tag 21a to identify a speaker who is speaking in the image. The speaker tag 21a may be displayed above the head of the speaker or at a position which enables recognition of the speaker.

The second display window 22 may display real-time speech-recognized text, and the third display window 23 may display speaker information of the real-time speech-recognized text on the second display window 22 and the speech-recognized text according to time.

The third display window 23 may display the real-time speech recognized text of the second display window 22 along with the speaker information according to time, and include check CHK columns to mark the text corrected by the corrector.

The fourth display window 24 may sort and display pieces of text displayed on the third display window 23 for each of the speakers.

The fifth display window 25 may display a combined speech from the above-described speech combiner 400 in the form of a signal, thereby supporting the corrector to specify an intended speech position through the inputter 10.

The sixth display window 26 may display various menus that enable control of the image and utterances displayed on the first and fifth display windows 25. For example, the sixth display window 26 may include menus, such as playback, fast forward, recording, and the like.

Application programs necessary for performing functions of the text corrector 300 are stored in the storage unit 30. In this case, when each function is activated in response to a request of the user, the storage unit 30 executes a corresponding application program and provides a relevant function under the control of the controller 60. The storage unit 30 may store a program for performing each mode, that is, a real-time input mode, a correction mode, and a speaker-specified play mode. In addition, the storage unit 30 may store an auto-text database (DB) to facilitate correction by the corrector. Also, the storage unit 30 may store a characteristic information DB including dialects, foreign words, exclamations, or fillers.

The speech reproducer 40 may receive and reproduce a speech session from the speech signal detector or the speech combiner under the control of the controller 60 so that the user can listen to the speech. For example, the speech reproducer 40 may include a speaker for auditory output.

The communicator 50 may include a communication interface for data transmission using various communication schemes under the control of the controller 60, and receive a speech session transmitted from the speech signal detector or speech-recognized text transmitted from the speech recognizer. In addition, the communicator 50 may receive revised text from the reviser.

The controller 60 may receive pieces of speech-recognized text from the speech recognizer, and arrange and display the pieces of text in the order of time points at which inputs of the speech signals are started in the second display window 22.

The controller 60 may include the real-time input mode, in which speech-recognized text is displayed and a speaker tag matching speaker information of the displayed text is highlighted for recognition, the correction mode, in which a speaker tag matching speaker information of text to be corrected is highlighted for recognition when information for correcting the speech-recognized text is input, and the speaker-specified play mode, in which speech-recognized text or utterances of speech sessions of a speaker matching a selected speaker tag is output according to time when a selection signal is input for each of the speaker tags.

In the real-time input mode, the controller 60 may display speech-recognized text from a real-time speech recognizer in the second display window 22, and may display an image of a plurality of speakers in the first display window 21. In this mode, the speaker tag 21a that matches a speaker reproduced by the speaker reproducer 40 may be distinctively displayed. For example, the controller 60 may change a color or shape of the matching speaker tag 21a so that a corrector can identify the speaker tag 21a. In addition, the controller 60 may display the speaker tag 21a of speaker information corresponding to real-time speech-recognized text in the second display window 22 so that the speaker tag 21a can be identified. That is, the controller 60 may perform control such that speech of a corresponding speech session is reproduced by the speech reproducer 40 while the real-time speech-recognized text is provided to the second display window 22, and may perform control such that the matching speaker tag 21a is highlighted in the first display window 21. Meanwhile, the controller 60 may change microphone information contained in the converted text from the speech recognizer into matching speaker information input through the inputter 10 by the corrector, and may display the changed information in the second display window 22. As described above, the controller 60 may solve a problem of being unable to identify a speaker only by a mouth shape when an image is displayed far away.

In the correction mode, information for correction may be received from the corrector through the inputter 10 to correct the speech-recognized text. That is, the controller 60 may receive a cursor movement for correction from the corrector through the inputter 10 in the real-time input mode, receive the information for correction after the cursor movement, and allow the speech-recognized text to be corrected. In this case, the controller 60 may highlight the speaker tag 21a matching speaker information of the corrected text so that the corrector can recognize the speaker corresponding to the corrected text. In this case, when the controller 60 receives the information for correcting the speech-recognized text, the controller 60 may pause the display of the text and, when the correction is completed, may resume the display of the text by returning to a point in time a predetermined amount of time in the past.

In the speaker-specified play mode, a selection signal for each speaker tag 21a may be received from the corrector through the inputter 10, and speech-recognized text or utterances of the speech sessions of a speaker corresponding to the selected speaker tag 21a may be output according to the time interval. In this case, the controller 60 may perform control such that an image of the selected speaker is displayed in the first display window 21, the text of the selected speaker is displayed in the second display window 22, and the utterance of the selected speaker is displayed in the speech reproducer 40.

In addition, the controller 60 may receive characteristic information of the speaker corresponding to each piece of microphone identification information through the inputter 10 and transmit the information to the speech recognizer in advance. Here, the characteristic information may include dialects, foreign words, exclamations, or fillers. The fillers may be speakers' own habits, such as, "well," "so," "like," "I mean," "actually," and "you know." Such characteristic information may be used as a hint when the speech recognizer recognizes speech and convert it into text. The controller 60 may provide the characteristic information DB stored in the storage unit 30 to the corrector through the display 20. For example, when the corrector selects the Gyeongsang-do dialect in the characteristic information DB, the controller 60 may transmit pieces of information for converting the Gyeongsang-do dialect to standard language to the speech recognizer. Meanwhile, the controller 60 is configured to transmit the characteristic information to the speech recognizer and control the speech recognizer to perform conversion to standard language in the embodiment of the present invention, but the controller 60 is not limited thereto. The controller 60 may be configured to directly correct the text received from the speech recognizer.

In addition, the controller 60 may display a punctuation mark by determining whether the text received from the speech recognizer has an ending. For example, when another character is present in front of a character, such as "da (다)," and "kka(까)," which is placed at an ending of a sentence, the controller 60 may attach a punctuation mark corresponding to the character, or, when the speech session is ended, the controller 60 may display a corresponding punctuation mark.

In this specification, exemplary embodiments of the present invention have been classified into first, second and third exemplary embodiments and described for conciseness. However, steps or functions of an exemplary embodiment may be combined with those of another exemplary embodiment to implement still another exemplary embodiment of the present invention.

What is claimed is:

1. A multi-speaker speech recognition correction system comprising:
   a speech signal detector configured to, when a plurality of speech signals are received from a plurality of microphones which are each provided to a corresponding one of a plurality of speakers, detect a speech session from a time point at which input of each of the speech signals is started to a time point at which the input of the speech signal is stopped;
   a speech recognizer configured to receive each of the speech sessions including time information and microphone identification information and convert the each of speech sessions to text;
   a speech combiner configured to receive speech sessions from the speech signal detector and combine the speech sessions in an order of time points at which the inputs of the speech signals are started; and
   a text corrector configured to receive pieces of speech-recognized text from the speech recognizer, receive speaker information for changing the microphone identification information, arrange and display the speaker information and the pieces of speech-recognized text in the order of time points at which the inputs of the speech signals are started, output an image obtained by capturing each of the plurality of speakers, display speaker tags for identifying each of the speakers in the image, output a speech combined by the speech combiner together with the speech-recognized text, and receive information for correcting the speech-recognized text,
   wherein the text corrector includes a real-time input mode in which the speech-recognized text is displayed and a speaker tag matching speaker information of the displayed text is highlighted for recognition, a correction mode in which a speaker tag matching speaker information of text which is to be corrected is highlighted for recognition when information for correcting the speech-recognized text is input in the real-time input mode, and a speaker-specified play mode in which speech-recognized text or utterances of speech sessions of a speaker matching a selected speaker tag is output according to time when a selection signal is input for each of the speaker tags,
   the text corrector pauses the display of the text when the information for correcting the speech-recognized text is received, and, when the correction is completed, the text corrector resumes the display of the text by returning to a point in time a predetermined amount of time in the past, the text corrector transmits characteristic information, including a dialect, foreign words, exclamations, or fillers, of a speaker corresponding to each piece of the microphone identification information to the speech recognizer in advance, and the speech recognizer converts the dialect to standard language, converts a foreign word to a native word, or removes an exclamation or a filler, which is a habit of the speaker, by applying the characteristic information received from the text corrector, and transmits a result thereof to the text corrector.

2. The multi-speaker speech recognition correction system of claim 1, wherein the text corrector displays a punctuation mark by determining whether text received from the speech recognizer has an ending.

3. The multi-speaker speech recognition correction system of claim 1, further comprising: a reviser configured to display a speech recognition result obtained by the speech recognizer and a correction result obtained by the text corrector to each of the plurality of speakers.

4. The multi-speaker speech recognition correction system of claim 3, wherein the reviser receives information for correction or a revision completion signal, and transmits the signal to the text corrector.

* * * * *